United States Patent [19]
Guggenbühl

[11] 3,868,498
[45] Feb. 25, 1975

[54] METHOD AND APPARATUS FOR DETERMINING ERRORS DURING COUNTING OF PARTICLES

[75] Inventor: Walter Guggenbühl, Zurich, Switzerland

[73] Assignee: Contraves AG, Zurich, Switzerland

[22] Filed: Mar. 12, 1973

[21] Appl. No.: 340,468

[30] Foreign Application Priority Data
Mar. 29, 1972 Switzerland..................... 4739/72

[52] U.S. Cl............................ 235/151.3, 235/92 PC
[51] Int. Cl...................... G06m 11/00, G06f 11/00
[58] Field of Search........ 235/151.3, 151.35, 92 PC, 235/92 EC, 92 CA, 92 EV, 153

[56] References Cited
UNITED STATES PATENTS 3,518,982 7/1970 Timmins et al........................ 128/2
3,551,657 12/1970 Darrington........................ 235/92 X
3,638,186 1/1972 Schwefel........................... 235/92 X
3,657,725 4/1972 Estelle et al. ......................... 235/92

Primary Examiner—Eugene G. Botz
Assistant Examiner—Edward J. Wise
Attorney, Agent, or Firm—Werner W. Kleeman

[57] ABSTRACT

A method of, and apparatus for, determining errors during counting of particles, each one of which indexes a counter by one unit during a measuring time. The measuring time is subdivided into two parts, preferably approximately equal parts, and the difference of the counting result for both measurement parts is determined and is compared with a predetermined tolerance value.

11 Claims, 2 Drawing Figures 3,868,498

METHOD AND APPARATUS FOR DETERMINING ERRORS DURING COUNTING OF PARTICLES

BACKGROUND OF THE INVENTION

The present invention relates to a new and improved method of determining errors during the counting of particles, each of which indexes or switches by one unit a counter mechanism during a measuring time or period, and also pertains to a new and improved apparatus for the performance of the aforesaid method.

A primary field of application of the method aspects of this development and apparatus for the performance thereof, is as an error monitoring device for a particle analyzer and, in particular, a blood cell analysis device or counter. The prior art is familiar, for instance, with blood cell analysis devices embodying a particle detector containing at both sides of a relatively short, narrow capillary path a respective compartment for an electrolytic blood thinner liquid and possessing an electrode in each such compartment. If a constant direct-current is conducted through both electrodes and the intermediately located liquid flow path which is constricted by the capillary path and, if at the same time the liquid containing the blood cells in a given dilution is forced through the capillary path from the one into the other liquid compartment, then whenever blood cells pass through the capillary path voltage pulses appear which clearly exceed the average or mean direct-current voltage peak. These pulses can be filtered in known manner and counted at a summation counter. The measuring time can be determined by means of a volumetric device containing a calibrated measuring tube in or through which the liquid with the suspended particles is conducted, an input and output signal transmitter which in conjunction with the calibrated measuring tube determines a predetermined volume. However, there are known to the art other time indicating means, for instance the measuring time can be determined by a predetermined watch time, wherein however the delivery capacity of the liquid conveying pump must be maintained constant. With such devices there is desired an error monitoring device which automatically indicates whether the counting operation has been falsified by internal disturbances of the equipment. Such disturbances can arise, for instance, due to contamination of the capillary path, errors arising during the volume measurement, impermissible fluctuations in the pump output or by virtue of electronic disturbances during the counting operation.

Disturbances during the volume measurement with a calibrated measuring tube can be ascertained by limiting in time the measurement time. However, this technique has the disadvantage that the thus conceived monitoring device responds to possible changes in pump delivering capacity or output. In order to safeguard against such false alarms, the time tolerance of monitoring device must be expanded so markedly that its usefulness becomes questionable. An integral monitoring of the functional reliability of the equipment is possible by comparing two or more successive measurements. However, this increases the total measuring time and requires storage means for storing the intermediate results. Additionally, in the case of automization the results of the measurements must be automatically compared with one another and the difference compared with an upper tolerance value. Furthermore, in the case of erroneous measurements valuable measuring time and sample liquid is lost. Carrying out two or more measurements at the same time does indeed eliminate the drawback of increasing the actual measuring time, however, only at the expense of a more complicated construction of the equipment.

SUMMARY OF THE INVENTION

Hence it is a primary object of the present invention to provide an improved method of, and apparatus for, determining errors during counting of particles in a manner which is not associated with the aforementioned drawbacks and limitations of the prior art proposals.

Still a further significant object of the present invention relates to a new and improved method of, and apparatus for, determining errors during counting of particles in an extremely rapid, efficient, economical and reliable manner, requiring a minimum in equipment expenditure.

Now in order to implement these and still further objects of the invention, which will become more readily apparent as the description proceeds, the method for determining errors during counting of particles as contemplated by the invention is manifested by the features that, the measurement time is divided into two parts, preferably approximately equal parts, the difference of the counting results for both parts of the measurement time is determined and compared with a predetermined tolerance value. Preferably, the difference of the counting results is obtained by forward counting the one measurement time part and backwards counting the other measurement time part. Furthermore, there is added to the numerical value of the one measurement time part one-half of the numerical value of the predetermined tolerance value.

Not only is the invention concerned with the aforementioned method aspects but also with apparatus for the performance thereof which, is generally manifested by the features that, there is provided a third switching signal transmitter constructed and arranged for subdividing the measurement time into two approximately equal parts. There is also provided a differential control-counter and in conjunction with switching-in switching-out signal transmitter is connected in such a manner that the switching-in signal transmitter, apart from starting the summation counter, also starts and places into operation the differential control-counter. The additional third switching signal transmitter controls the differential control-counter to carry out a backward counting operation and the switch-out signal transmitter shuts-off both counters. The error monitoring device is advantageously automated by providing a counter comparator and an input for a predetermined tolerance value and for pre-adjusting the differential control-counter by setting such to a value corresponding to one-half of the numerical value of the tolerance value, and comparison of the numerical values during the measurement operation is initiated by the read-out command of a logic block or component.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
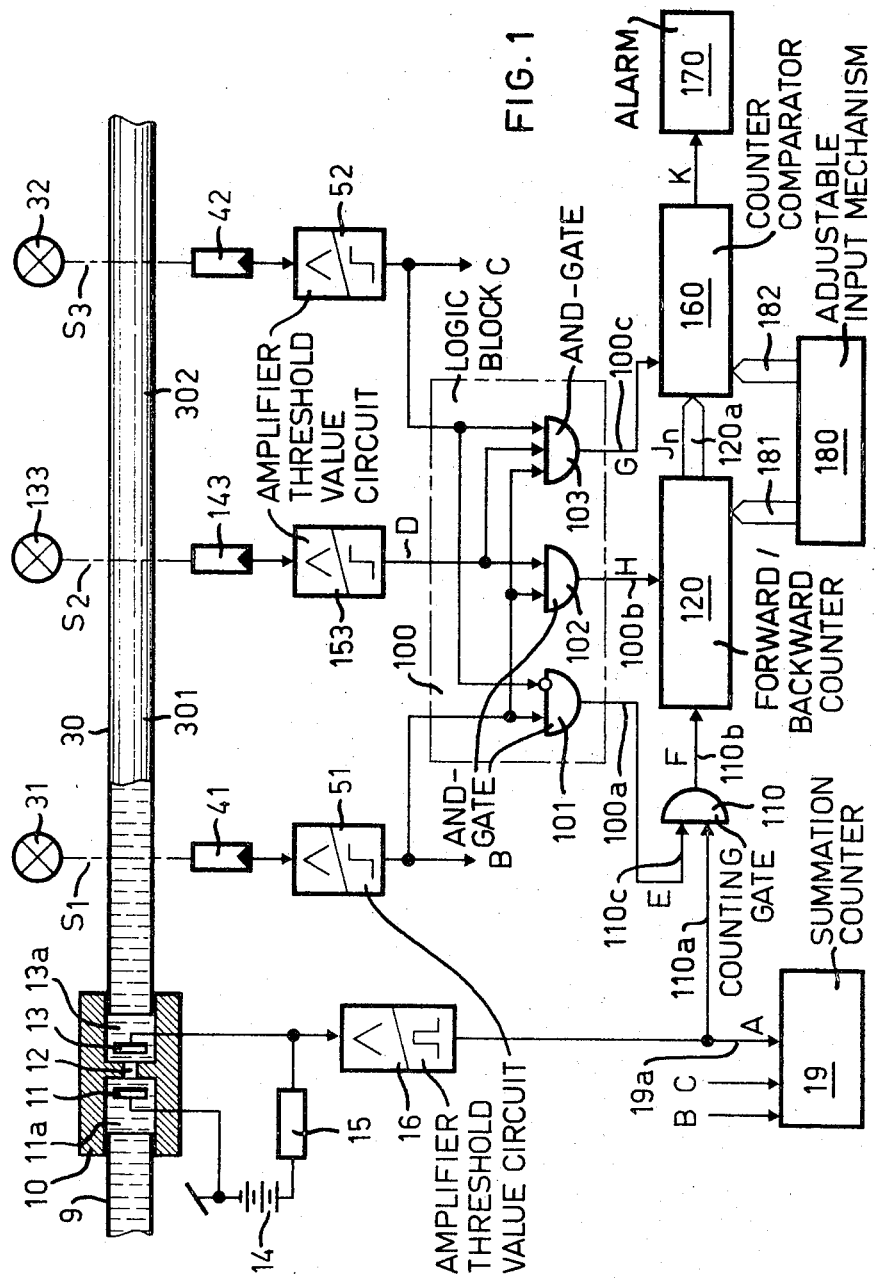
FIG. 1 is a partial schematic illustration of a part of the particle detector- and volume measuring device combined with an error monitoring device designed according to the teachings of the invention.

Referring now to the drawings, there is illustrated in FIG. 1 a measuring cell 10 of a particle detecting apparatus wherein, between two electrodes 11 and 13 of the measuring cell 10, there is provided a relatively short capillary connection or passageway 12. The electrodes 11 and 13 are each arranged in a respective liquid or fluid compartment 11a and 13a. One pole of a suitable direct-current voltage source 14 is connected with electrode 11. The other pole of this direct-current voltage source 14 is connected through the agency of a resistor 15 with the other electrode 13 and with the input of an amplifier threshold value circuit arrangement or switch 16. The sample liquid is sucked-up by a non-illustrated pump from a non-illustrated sample container through a suction pipe or conduit 9 into the measuring cell 10 and then into a calibrated volume measuring tube 30 formed of a suitable transparent material, such as plastic or glass. During passage of particles, typically blood cells, through the capillary passageway or connection 12, the electrical conductivity at the fluid measuring path between the electrodes 11 and 13 changes in known manner, so that pulses are generated. These pulses are then delivered to the amplifier threshold value circuit 16 and from that location are delivered in the form of a pulse train or sequence A to a summation or adding counter 19 for carrying out the actual particle counting operation.

Serving as the time transmitter means with a switching-in and a switching-out signal transmitter for limiting or controlling the measurement time, there is provided in this case a volumetric measuring device consisting of a calibrated volume measuring tube 30 and two photoelectric devices, in particular a respective light source 31 and 32 and a respective photoelectric cell 41 and 42 and a respective amplifier threshold value circuit arrangement or switch 51 and 52. Each of the two photoelectric devices 31, 41, 51 and 32, 42, 52 considered above, which are arranged at a predetermined spacing from one another along the calibrated measurement tube 30, generate during the movement of the level of sample liquid therepast a signal B and C respectively at the respective associated light barrier S1 and S3 respectively, owing to the thus occurring changes in the optical properties. These signal are employed for at least switching-in and switching-out the summation counter 19.

The inventive error monitoring apparatus contemplated by this development comprises a further photoelectric device with a light source 133, a photoelectric cell 143 and an amplifier threshold value circuit arrangement or switch 153. This additional photoelectric device 133, 143, 153 is arranged at the calibrated measuring tube 30 in such a manner that the measuring volume which is limited by both of the first mentioned photoelectric devices 31, 41, 51 and 32, 42, 52 is now subdivided into two equal size measurement volume parts or portions 301 and 302. The output signals B, C and D of the three photoelectric devices 31, 41, 51 and 32, 42, 52 and 133, 143, 153 respectively are now delivered to a logic block or component 100. A respective output 100a, 100b and 100c of this logic component or block 100 is provided with a counting gate 110, a forward/backward counter 120 serving as the differential control counter mechanism, and a counter comparator 160 respectively. The pulse train or sequence A is likewise delivered to the input 110a of the counting gate 110 and with an appropriate switching state of the counting gate further delivered via the line 110b to the forward/backward counter 120. By means of a parallel output 120a the output signal $J_n$ of the forward/backward counter 120 are delivered to the counter comparator 160. An adjustable input mechanism 180 is connected via the conductors 181 and 182 with the forward/backward counter 120 and the counter comparator 160 respectively. An alarm mechanism 170 is controlled by the counter comparator by means of a signal K.

The counting result of the two measurement time portions 301 and 302 delimited by the three switching signal transmitters or photoelectric devices as above explained, in the case where the counting result proceeds properly, must coincide within the statistical inaccuracies of the counting principle. If the number of blood cells which are to be measured for an entire measurement or measuring time is assumed to amount to $n = 30,000$, then, the deviation of the counting operation $\sqrt{n}/n = 0.58\%$. For half of the measuring time this numerical value amounts to $\sqrt{n/2}/n/2 = 0.82\%$. However, in the tolerance for the comparison of both measurement time partial results, there also must be taken into account the setting accuracies of the switching signal transmitters. If all counting operations are accepted within plus/minus twice the standard deviation, then there results for red blood cells with $n = 30,000$ a permissible tolerance of $\pm \Delta Z = \pm 2.32\%$. The occurrence of measurement results which have been so closely tolerated to unity at both measurement time parts upon soiling of the capillary path as well as with errors in the time transmitter unit or the counting unit is very improbable.

Advantageously, the third switching signal transmitter or photoelectric device 133, 143, 153 is arranged such that two equal measurement time parts are formed. Furthermore, owing to the presetting of the forward/backward counter to one-half of the numerical value ($\Delta Z$) of a predetermined tolerance ($2 \Delta Z$) there is prevented overrunning of the counter past null during the backward counting operation. With the aid of the counter comparator 160 which has been preadjusted to the predetermined tolerance value ($2 \Delta Z$) there is automatically triggered an alarm signal during erroneous counting.

The mode of operation of this error monitoring device, for instance employed in conjunction with a blood cell analyzer is as follows:

Now for a measurement series there is set at a conventional input mechanism 180, which may be for instance a standard multiposition selector switch as taught for instance in U.S. Pat. No. 3,566,049, granted Feb. 23, 1971, the numerical value of a predetermined tolerance value and also the numerical value corresponding to one-half of such tolerance value. It is conceivable that input of this information can take place automatically upon actuating a particle-type selection key, for instance a red key for counting red blood cells or a white key for counting white blood cells. Upon commencing the measuring operation, the blood cells are detected at the measuring cell 10 and by means of the amplifier-threshold value circuit arrangement or switch 16 the result is delivered in the form of standardized electrical pulses or pulse sequences A to the input 19a of the summation counter 19 and the input 110a of the counting gate 120. As soon as the level of the sample liquid in which the blood cells are suspended, owing to the suction action of the non-illustrated pump, has reached the light barrier $S_1$ the resultant signal B produced at the corresponding photoelectric device 31, 41, 51, is also delivered to three AND-gates 101, 102, and 103 of the logic block or component 100. Due to negation of a second signal at the input of the AND-gate 101 the latter becomes conductive and delivers a control voltage or pulse E to the other input 110c of the counting gate 110. As a result, the switching condition for the counting gate 110 has been fulfilled and an output signal F triggers forward counting of the pulses of the pulse train or sequence A by the forward/backward counter 120. If the level of the liquid sample reaches the light barrier $S_2$, then the thus generated signal D, through the agency of the AND- gate 102 and the now conductive output signal H, triggers the switching-over of the forward/backward counter 120 to carry out a backward counting operation. The now incoming pulses of the pulse sequence A are not subtracted from the counting value which has been reached up to that point of time. By means of the signal C, which is generated due to passage of the level of the sample liquid at the light barrier $S_3$, the output of the AND- gate 101 and therefore likewise the counting gate 110 assumes the condition O, wherein the counting operation is stopped. By means of the signal C there is however simultaneously fulfilled the switching conditions for the AND- gate 103. By means of its output signal G the read-out command is delivered to the counter comparator 160. An exemplary embodiment of counter comparator of relatively simple design for comparing the resultant counting value of the forward/backward counter 120 with the preset tolerance value will be considered hereinafter in conjunction with FIG. 2. Acceptance or non-acceptance of the measurement result and the counting or numerical value of the summation counter 19 can be indicated via the signal K optically or acoustically in known manner by means of the alarm unit 170.

Figure 2:
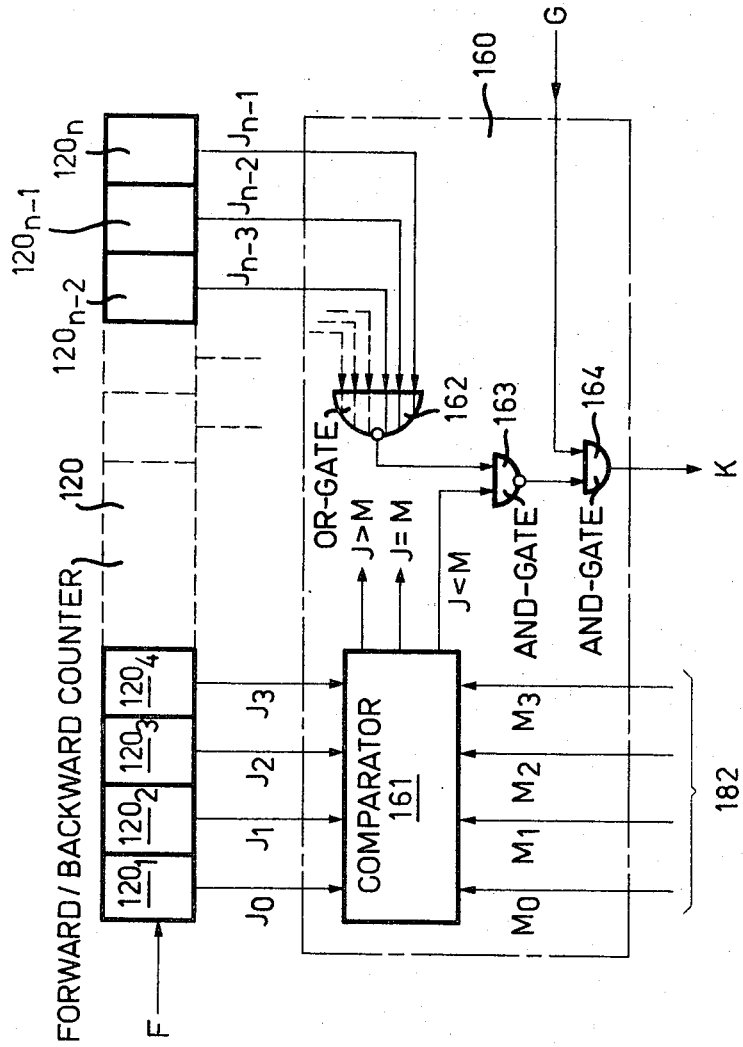
FIG. 2 is a schematic illustration of a numeral comparator for instance for 4-bit comparison.

Considering now FIG. 2, it is to be understood that the parallel outputs $J_o - J_{n-1}$ of the conventional binary counting stages $120_1 - 120_n$ of the forward/backward counter 120 and the tolerance value which has been preset thereat in digital form and its converted binary values $M_o - M_3$ are to be compared. With an acceptable measurement, determined by the nature of the problem, there appear only nulls at the significant counter stages of the forward/backward counter 120. Only at the counting stages with low significance can there appear information $\neq 0$. For simplification of the illustration, it is assumed in this example that the predetermined tolerance value is equal to 2 $\Delta Z$ <12. In the event that a measurement is within this tolerance value, then the corresponding output J of all counting stages greater than $120_4$ nust be at 0. The output values $J_o - J_3$ of the first four counting stages $120_1 - 120_4$ are evaluated by means of a predetermined tolerance value $M_o - M_3$ in a conventional 4-bit comparator 161. If the evaluation indicates that J<M, in other words, the tolerance has been maintained, then there appears at the output J<M of the comparator 161 the value L. In the event that at the input of an OR-gate 162 all J type- values are equal to 0, then owing to negation of the output of this gate there likewise appears the value L at the input of AND- gate 163. By virtue of the negation at the output of the AND- gate 163, there is, however, delivered to an AND- gate 164 the value 0. Together with a value L of the read-out signal G the value at the output of the gate 164 is 0, that is to say, in the case the numerical value of the summation counter 19 can be accepted.

As previously indicated, the limitation to a 4-bit comparator 161 has been merely illustratively given for the sake of simplicity. Yet it should be expressly understood that an extension of the principle is possible by a cascade circuit of such known circuit block.

The improvement upon known time transmitting means as proposed by the invention, especially the described volume measuring system for particle counters, through the use of a further switching signal transmitter, especially if such responds exactly at one-half of the measurement volume, and the use of a forward-/backward counter as the differential control counter, affords an elegant, reliable and economical checking of the particle counting operation. Instead of the preset of one-half of the tolerance value at the forward counter circuit, it would be possible for the additional third switching signal transmitter to be arranged such that the first measuring time part for forward counting is increased with regard to the second measuring time part for the backward counting by one-half of the tolerance value ($\Delta Z$). This of course would render more difficult the adjustment or setting possibility for different $\Delta Z$ values. Basically, the resulting numerical value, which is rendered visible by an indicator, could be also semi-automatically compared by the operator at the end of the measurement operation with a tolerance table value.

While there is shown and described present preferred embodiments of the invention, it is to be distinctly understood that the invention is not limited thereto, but may be otherwise variously embodied and practiced within the scope of the following claims. Accordingly,

What is claimed is:

1. A method of determining errors during counting of particles, each of which indexes a counter by one unit during a measuring time, comprising the steps of subdividing the measuring time into two parts, determining the difference of the counting result for both measurement time parts, and comparing the difference with a predetermined tolerance value.

2. The method as defined in claim 1, including the step of maintaining the one measuring time part greater than the other measuring time part by one-half of the predetermined tolerance value.

3. The method as defined in claim 1, including the step of maintaining both measuring time parts to be of the same magnitude.

4. The method as defined in claim 3, including the step of adding to the numerical value of the one measuring time part one-half of the numerical value of the predetermined tolerance value.

5. The method as defined in claim 1, wherein the difference of the counting result is formed by forward counting of the one measuring time part and backwards counting of the other measuring time part.

6. The method as defined in claim 5, especially for counting particles suspended in a liquid, wherein the measuring time lasts from the moment of switching-in the measuring time up to the point in time where there is determined throughpassage of a predetermined liquid volume, and after throughpassage of one-half of such predetermined liquid volume operating a previously forwardly counting counter so as to count backwards.

7. An apparatus for determining errors during counting of particles, comprising a particle detecting device for producing electrical pulses to be counted during throughpassage of the particles, a summation counter for counting said electrical pulses, time transmitter means with switch-in and switch-out signal transmitter means for limiting the measuring time, a further switching signal transmitter means for dividing the measuring time into two parts, a differential control counter connected in circuit with the switch-in and switch-out signal transmitter means in such a manner that the switch-in signal transmitter means, apart from placing into operation the summation counter, also starts the differential control counter, said further switching signal transmitter means controlling the differential control counter to count backwards and the switch-out signal transmitter means switching off both said counters.

8. The apparatus as defined in claim 7 wherein said further switching signal transmitter means divides the measuring time into two approximately equal parts.

9. The apparatus as defined in claim 7, further including an adjustable input mechanism for pre-setting the differential control counter to one-half of the numerical value of a predetermined tolerance value, a counter comparator arranged in circuit after the differential control counter for comparing a predetermined tolerance value introduced via the input mechanism with the numerical value of the differential control counter, a counting gate, a logic block at which there is respectively formed from the signals of the signal transmitter means a control pulse for the counting gate for passing the counting pulses to the differential control counter, a control pulse for backwards counting of the differential control counter, and a read-out command for the counting comparator at the end of the measuring operation.

10. The apparatus as defined in claim 7, wherein said particle detecting device comprises a measuring cell provided with a narrow flow passageway, a respective electrode arranged to each side of said narrow flow passageway, a calibrated measuring tube in flow communication with said measuring cell, a liquid sample comprising an electrolyte containing the particles suspended therein moving through the narrow flow passageway of said measuring cell into said calibrated measuring tube, said calibrated measuring tube being formed of transparent material, and said signal transmitter means each comprising a photoelectric device arranged at a predetermined spacing from one another along the calibrated measuring tube and which upon passage of the level of the liquid sample produces signals due to the thus occurring change in the optical properties.

11. An apparatus for determining errors during counting of particles, comprising a particle detecting means for producing electrical pulses to be counted during throughpassage of the particles, a summation counter for counting said electrical pulses, time transmitter means with a switch-in transmitter means and a switch-out signal transmitter means for limiting the measuring time, a third switching signal transmitter means for dividing the measuring time into two parts, a differential control counter for forwards and backwards counting connected in circuit with the switch-in and switch-out signal transmitter means in such a manner that the switch-in signal transmitter means, apart from placing into operation the summation counter, also places into operation the differential control counter for forwards counting, said third switching signal transmitter means controlling the differential control counter to count backwards, and the switch-out signal transmitter means switching off both said counters.

* * * * *